3,647,851
SECONDARY ALCOHOL SULFATION PROCESS IN THE PRESENCE OF INORGANIC SALTS
John B. Wilkes, Richmond, Calif., assignor to Chevron Research Company, San Francisco, Calif.
No Drawing. Filed June 29, 1967, Ser. No. 649,839
Int. Cl. C07c *141/04*
U.S. Cl. 260—459                                                   13 Claims

ABSTRACT OF THE DISCLOSURE

By the addition of certain finely divided salts to a chlorosulfonic acid-secondary alcohol sulfation mixture, side reactions are inhibited.

---

It is known in the art to produce secondary alcohol sulfate half-esters, e.g., $ROSO_3H$, by the reaction chlorosulfonic acid with secondary alcohols. It is also known that undesirable side reactions, such as neutral oil formation, can be materially reduced by the presence in the reaction mixture of organic stabilizing agents such as ethers, ethoxylates or tertiary amines. While these agents are more or less a solution to the problem, there are drawbacks incidental to their use including recovery, odor and the like.

It has now been found in the sulfation of a higher secondary alcohol under substantially anhydrous conditions by the reaction of chlorosulfonic acid with the alcohol in the liquid phase in a hydrocarbon or chlorinated hydrocarbon solvent at a temperature below about 125° F. that neutral oil forming side reactions are substantially inhibited and reduced by the addition of finely-divided salt to the reaction mixture. The addition of from about 0.05 to 5 mols of sodium, ammonium, potassium and magnesium chloride, sulfate, phosphate, pyrophosphate or carbonate salt per mol of the alcohol is effective in the reduction of neutral oil formation, and yields of the desired sulfated secondary alcohol are substantially improved.

By a higher secondary alcohol is meant by definition an alcohol containing from 5 to 25 carbon atoms per molecule of the formula $RCH_2CHOHCH_2R'$ in which R and R' may be hydrogen or an inert hydrocarbon radical. The corresponding sulfate half-ester is of the formula $(RCH_2)(R'CH_2)CHOSO_3H$.

By substantially anhydrous conditions is meant by definition that during the sulfation reaction less than 10 mol percent of water based upon the chlorosulfonic acid used for the sulfation reaction is introduced into the reaction mixture during the sulfation reaction whether via the reactants, or otherwise. The presence of water in the reaction system is undesirable because it reacts with chlorosulfonic acid to form sulfuric acid and hydrogen chloride to the detriment of the desired sulfation reaction.

By finely-divided is meant by definition particle sizing in the range 0.1 to 200 microns average diameter.

By neutral oil is meant all organic compounds other than alcohol sulfate half-ester and added solvent which are present in the reaction product mixture obtained by the reaction of chlorosulfonic acid with a higher secondary alcohol under the process conditions herein defined.

In general, neutral oil comprises dialkyl sulfate ester, $(RO)_2SO_2$, and olefinic hydrocarbon and polymers thereof, resulting from higher secondary alcohol or sulfate ester degradation(s) during the course of the sulfation reaction.

In a preferred embodiment of the present invention a mixture of straight chain secondary alkanols of the $C_8$–$C_{16}$ molecular weight range is dissolved in isopentane to yield a 20–25 weight percent solution, and for each mol of alcohol in this solution about 0.5 formula weight of finely-divided sodium chloride is added. The particle sizing of the salt should be in the range 1 to 50 microns average diameter. While maintaining the resulting mixture at about 30–35° F., 1.05 mols of chlorosulfonic acid for each mol of alcohol is added. Best results are obtained when the reaction mixture is efficiently stirred and localized excesses of the acid are avoided. The sulfation reaction is fast and essentially complete within about 10 minutes of the completion of the acid addition. The yield of monoester, based upon alcohol, is in general in the range 85–90 mol percent.

After the reaction is completed, the reaction product mixture is neutralized with a suitable base, for example, sodium hydroxide, and the alcohol-sulfate-salt is further processed as desired.

In general, the smaller the particle sizing of the added salt, the more effective is the desired inhibition of the neutral oil forming side reaction(s). Preferably, the salt should be sized in the range from about 1 to 50 microns. On the other hand, larger sized salt particles are useful and may have average diameters of as much as 200 microns and yet be relatively effective.

As little as 0.05 formula weight of salt per mol of secondary alcohol causes an appreciable inhibition. Preferably from about 0.1 to 0.5 mol per mol should be employed. Additional salt can cause some further advantage. On the other hand, the addition of an excess does not appear to be helpful or deleterious except that at very high (addition) ratios, e.g., of the order of 6–10 mols of salt per mol of alcohol, mixing becomes more difficult. In general, relative amounts in the mol ratio range of about 0.1–5 to 1 are satisfactory. Where added salt is desired as a builder for an ultimate detergent product, it may be desirable and convenient to add all of the salt during the sulfation reaction, regardless of excess with respect to the desired inhibitory effect. In this event the preferred range may be exceeded by as much as a 1–10 mol excess of salt.

Sodium salts are preferred inhibitors, particularly sodium chloride and sodium sulfate.

Hydrocarbons, halogenated hydrocarbons and mixtures thereof of the solvent range, e.g., having less than about 16 carbon atoms per molecule, are useful media for the instant process, and these include the ordinary hydrocarbon and halogenated hydrocarbon solvents as known and used in the chemical art in general. The preferred media, because of their volatility and ease of removal from the product, are the lower hydrocarbons and lower halogenated hydrocarbons of the $C_3$–$C_9$ range and mixtures thereof. Of the halocarbons, the chlorinated methanes are preferred.

Representative useful solvent media are isobutane, pentane, isopentane, petroleum ether, Stoddard solvent, e.g., petroleum refinery solvent fractions, benzene, toluene, xylene, methylene chloride, 1,1,1-trichloroethane, pentachloroethane, tetrachloroethane, methyl chloride, chloroform, carbon tetrachloride, chlorobenzene, fluorinated hydrocarbons such as fluorotrichloromethane, perfluoropropane etc., solvent mixtures and the like.

For satisfactory mono-sulfation of higher secondary alcohols and the inhibition of neutral oil by-product formation by the addition of a salt as described herein, the alcohol should be appreciably diluted with a hydrocarbon solvent, a halogenated hydrocarbon solvent, or mixtures thereof. In general at least 30 volume percent of the solution should be solvent. Preferably the solvent comprises from about 60 to 85 volume percent. Extreme dilution, as where the solute alcohol is of the order of 1 volume percent, is ordinarily unsatisfactory for reasons of practicality. Correspondingly, in general the alcohol solute should comprise from about 1 to 70 volume percent of the solution.

Except where partial conversions of the alcohol to sulfate ester is desired, substantially stoichiometric amounts of chlorosulfonic acid relative to the alcohol should be used in the process. An appreciable excess of the acid in the reaction mixture promotes neutral oil formation at the expense of the desired monoester product.

By definition, by a substantially stoichiometric amount of chlorosulfonic acid relative to the present secondary alcohol feeds is meant 0.8–1.2 mols per mol, respectively. Preferably from about 0.95–1.1 to 1 mol of the acid per mol of alcohol, respectively, are employed.

In the use of the more volatile solvent media at elevated temperatures, for example difluorodichloromethane, propane, methylene chloride, isobutane etc., a superatmospheric pressure sufficient to maintain the required dilution of the reactants is necessary, e.g., to maintain the liquid reaction system.

In general satisfactory reaction temperatures for the sulfation of higher secondary alcohols wtih chlorosulfonic acid are those below about 125° F. On the other hand, the temperature should be sufficiently elevated to maintain a reasonable concentration of the alcohol in the solvent, e.g., greater than about 1 volume percent. In general and depending upon the solvent and alcohol combination, temperature as low as 0–20° F. are satisfactory. The range from about 20° F. to 50° F. is the preferred reaction temperature.

Secondary alcohols of the formula $RCH_2CHOHCH_2R'$, containing from 5 to 25 carbon atoms per molecule and in which R and R' are selected from the group of hydrogen and insert hydrocarbon radicals, are in general satisfactory feeds for the instant process.

By an inert hydrocarbon radical is meant that the radical contains no olefinic unsaturation and no acetylenic unsaturation; it may contain aromatic unsaturation.

Preferably R and R' are hydrogen and alkyl radicals.

Representative secondary alcohols which are useful process feeds for the subject process include 2-pentanol, 3-pentanol, 4-eicosanol, 5-pentacosanol, 6-tetracosanol, 7-tricosanol, 8-docosanol, 2-dodecanol, 3-undecanol, 1-phenyl-4-octanol, 2-phenyl-6-tetradecanol, 3-cyclohexyl-8-dodecanol, 1-($\alpha$-naphthyl)-5-decanol, 1-cyclooctyl-4-decanol, 2,3,4-trimethyl-7-dodecanol, 2,2-dimethyl-5-octanol, 4-ethyl-8-undecanol, 2-methyl-3-ethyl-6-pentadecanol, 2-methyl-3-propyl-8-hexadecanol, 2,2,8,8 - tetramethyl-5-tetradecanol, 2,11-dimethyl-5-dodecanol, and the like higher secondary alcohols as well as molecular mixtures thereof. That is, R and R' in the above formula may be straight or branched chain alkyl, cycloalkyl, alkylcycloalkyl, aryl, alkylaryl, cycloalkylaryl, combinations thereof and the like, so long as the alcohol is free of olefinic unsaturation. Of the alkanols, the straight chain secondary alkanols are most preferred because of their detergent properties and availability. For detergency, the $C_{12}$–$C_{20}$ straight chain monoalkyl sulfate esters are especially desirable.

In the examples described below, neutral oil is conveniently determined by adding sufficient cold aqueous-ethanolic (equal volumes) sodium hydroxide (10 weight percent) solution to an aliquot of sulfation product to yield a neutral solution and extracting the resulting aqueous-ethanolic solution with petroleum ether. For the extraction 3 volumes of petroleum ether, based upon the volume of aqueous-ethanolic alkali required, is divided into five approximately equal portions which are used for five separate extractions. The extracts are then combined and the solvent removed by distillation, leaving the neutral oil extract as a residue.

EXAMPLES 1–5

Into a reactor fitted for stirring and vented to the atmosphere, there were charged, in parts by weight, 1 part of straight chain mixed secondary alcohol, 4.5 parts of methylene chloride and 1 part of isobutane (30–32° F. runs only) or isopentane (70° F. run). Approximately the stoichiometric requirement (0.97-1.07 to 1) of chlorosulfonic acid was then added over a period of about 10 seconds. During the entire operation the mixture was stirred, and a portion of the solvent was allowed to boil off, thereby maintaining the desired temperature. At the conclusion of the run, the reaction was quenched (to prevent follow-up neutral oil formation) by the addition of sufficient ice-cold 1 N sodium hydroxide solution for neutralization. The product was then analyzed by standard techniques including Hyamine titration, nuclear magnetic resonance spectra and the like. The results and other conditions were as follows:

TABLE I

| Ex. | s-ROH feed | Mol ratio $HSO_3Cl$: ROH | Temp., °F. | Reaction time, min. | $ROSO_3H$ yield, mol percent | Neutral oil, wt. percent of product |
| --- | --- | --- | --- | --- | --- | --- |
| 1 | $C_{15}$–$C_{17}$ | 0.97 | 30–32 | 10 | 75 | 18 |
| 2 | $C_{15}$–$C_{17}$ | 1.07 | 30–32 | 10 | 62 | 31 |
| 3 | $C_{11}$–$C_{15}$ | 1.05 | 30–32 | 10 | 64 | 29 |
| 4 | $C_{15}$–$C_{17}$ | 1.00 | 54 | 6 | 49 | 42 |
| 5 | $C_{15}$–$C_{17}$ | 1.01 | 70 | 3 | 54 | 39 |

These data demonstrate that losses to neutral oil by-product formation are a substantial factor in the sulfation of secondary alcohols with chlorosulfonic acid.

EXAMPLES 6–19

In a manner analogous to the above examples, secondary alcohol was sulfated except that finely-divided salt was added to the reaction mixture prior to the sulfation. For each mol of $C_{15}$–$C_{17}$ s-alcohol from 1.05 to 1.07 mols of chlorosulfonic acid were added. Other details and results noted were as listed in Table II following.

TABLE II

| Example No. | Salt* Type | Salt* Mols/mol ROH | Salt* Sizing | Reaction time, min. | $RSO_3H$ yield, mol percent | Neutral oil wt. percent of product |
| --- | --- | --- | --- | --- | --- | --- |
| Sulfation at 30–32° F. in $CH_2Cl_2$-isobutane | | | | | | |
| 6 | None | | | 3 | 78 | 17 |
| 7 | NaCl | 0.5 | Ball-milled | 10 | 91 | 7 |
| 8 | NaCl | 1.0 | 200 mesh | 6 | 88 | 9 |
| 9 | NaCl | 1.0 | Ball-milled | 10 | 89 | 8 |
| 10 | $Na_2SO_4$ | 0.5 | do | 10 | 87 | |
| 11 | $K_2SO_4$ | 0.32 | 325 mesh | 6 | 88 | 9 |
| 12 | $Na_4P_2O_7$ | 0.25 | Ball-milled | 10 | 88 | 8 |
| 13 | KCl | 0.5 | do | 10 | 85 | 11 |
| 14 | $NH_4Cl$ | 0.5 | do | 10 | 85 | 11 |
| 15 | $NH_4Cl$ | 1.0 | do | 15 | 84 | 11 |
| 16 | $(NH_4)_2SO_4$ | 0.5 | do | 15 | 83 | 11 |
| 17 | $Na_2CO_3$ | 0.5 | do | 10 | 85 | |
| Sulfation at 70° F. in $CH_2Cl_2$-isopentane | | | | | | |
| 18 | None | | | 0.7 | 69 | 23 |
| 19 | $Na_4P_2O_7$ | 0.25 | Ball-milled | 1.5 | 75 | 18 |

*All salts used were free flowing powders (particle sizing below 100 microns) containing less than 1% by weight of water.

The above examples demonstrate that the addition of finely-divided sodium, potassium and ammonium chlorides, sulfates, carbonates and pyrophosphates to a secondary alcohol-chlorosulfonic acid sulfation reaction mixture is effective for the substantial inhibition of neutral oil formation. The corresponding phosphate salts are also useful in this regard.

In general the addition of finely-divided salt to a sulfation reaction mixture as herein described and under the reaction conditions prescribed is an effective means for inhibiting neutral oil formation. Usually, based upon the amount of neutral oil formed in the absence of added finely-divided salt, a reduction of neutral oil formation of at least 10 weight percent is experienced, i.e., a substantial reduction, when salt is added.

The added salt, in addition to inhibiting the formation of by-product neutral oil during the sulfation, serves to inhibit follow-up neutral oil formation after the reaction is complete, making an immediate quench of the product with alkali unnecessary.

EXAMPLE 20

Into a 500 ml. glass turbomixer fitted for temperature control was charged 34.0 g. of a $C_{15}$-$C_{17}$ straight chain secondary alcohol mixture, 11.8 g. of anhydrous sodium chloride (2–20 micron particle sizing) and 105 g. (170 mls.) of isopentane. While the above mixture was being efficiently stirred, 16.9 g. of chlorosulfonic acid were added via an 0.7 mm. capillary tube. The addition time was 5 minutes, and the temperature range of the reaction mixture was 30–39° F. Ten minutes after the acid addition had been completed, the yield of secondary alcohol sulfate, $$ROSO_3H$$

had reached maximum, 84 mol percent based upon feed. No loss or gain of yield was notable after an additional 10 minutes at temperature. The product was then neutralized with aqueous-ethanolic sodium hydroxide solution.

This example demonstrates that inert hydrocarbon media are useful for the instant process.

As will be evident to those skilled in the art, various modifications on this process can be made or followed, in the light of the foregoing disclosure and discussion, without departing from the spirit or scope of the disclosure or from the scope of the following claims.

What is claimed is:

1. In the process for the production of a secondary alcohol sulfate half-ester by the substantially anhydrous liquid phase reaction of a secondary alcohol with chlorosulfonic acid by the addition of substantially the stoichiometric amount of the acid to a solution of said alcohol in an inert hydrocarbon or halogenated hydrocarbon solvent, or mixtures thereof, said solution being maintained at a temperature in the range below about 125° F. and above about 0° F., said alcohol having a carbon atom content in the range from about 5 to 25 and being of the formula $RCH_2CHOHCH_2R'$, wherein R and R' are selected from the group consisting of hydrogen and hydrocarbon radicals lacking olefinic and acetylenic unsaturation, the improvement consisting essentially of adding to said reaction system for each mol of said alcohol from about 0.05 to 10 mols of a salt, said salt being a finely-divided salt selected from the group consisting of sodium, potassium, magnesium and ammonium chloride, sulfate, phosphate, pyrophosphate and carbonate, wherein said alcohol solute constitutes from about 1 to 70 volume percent of said solution, thereby substantially reducing neutral oil formation by the addition of said salt.

2. The process as in claim 1 wherein said neutral oil reduction is at least 10 weight percent, based upon the amount of neutral oil formed under the same reaction conditions except for the salt addition.

3. The process as in claim 1 wherein said salt has an average particle size diameter in the range 1 to 50 microns.

4. The process as in claim 1 wherein said salt is sodium chloride.

5. The process as in claim 1 wherein said salt is sodium sulfate.

6. The process as in claim 1 wherein for each mol of said alcohol from about 0.1–5 mols of said salt is added.

7. The process of claim 1 wherein said alcohol comprises from about 15 to 40 volume percent of said reaction solution.

8. The process as in claim 1 wherein said reaction temperature is in the range from about 20° F. to 50° F.

9. The process as in claim 1 wherein said solvent is a lower hydrocarbon, a chlorinated lower hydrocarbon or mixtures thereof.

10. The process as in claim 1 wherein for each mol of said alcohol from about 0.95–1.1 mols of chlorosulfonic acid is added.

11. The process of claim 1 wherein said temperature is in the range 20° F. to 50° F., said salt has a particle size in the 1 to 50 micron average diameter range and is added in an amount for each mol of said alcohol in the range from about 0.1 to about 0.5.

12. In the process of the production of a secondary alcohol sulfate half-ester by the substantially anhydrous liquid phase reaction of a secondary alcohol with chlorosulfonic acid by the addition of substantially the stoichiometric amount of the acid to a solution of said alcohol in an inert hydrocarbon or chlorinated hydrocarbon solvent, said solution being maintained at a temperature in the range below about 125° F. and above about 0° F., and said alcohol having a carbon atom content in the range from about 12 to 20 and being of the formula $$RCH_2CHOHCH_2R'$$

wherein R and R' are selected from the group consisting of hydrogen and straight chain alkyl groups, the improvement which comprises adding to said reaction system for each mol of said alcohol from about 0.05 to 10 mols of a salt, said salt being a finely-divided salt selected from the group consisting of sodium, potassium, magnesium and ammonium chloride, sulfate, phosphate, pyrophosphate and carbonate, wherein said alcohol solute constitutes from about 1 to 70 volume per cent of said solution, thereby substantially reducing neutral oil formation by the addition of said salt.

13. In a process for the production of a secondary alcohol sulfate half-ester by the substantially anhydrous liquid phase reaction on a secondary alcohol with chlorosulfonic acid by the addition of substantially the stoichiometric amount of the acid to a solution of said alcohol in an inert hydrocarbon or chlorinated hydrocarbon solvent, said solution being maintained at a temperature in the range below about 125° F. and above about 0° F., said alcohol having a carbon atom content in the range from about 5 to 25 and being of the formula $$RCH_2CHOHCH_2R'$$

wherein R and R' are selected from the group consisting of hydrogen and hydrocarbon radicals of the group consisting of alkyl, cycloalkyl, alkylcycloalkyl, aryl, alkylaryl and cycloalkylaryl, the improvement consisting essentially of adding to said reaction system for each mol of said alcohol from about 0.05 to 10 mols of a salt, said salt being a finely-divided salt selected from the group consisting of sodium, potassium, magnesium and ammonium chloride, sulfate and carbonate, wherein said alcohol solute constitutes from about 1 to 70 volume percent of said solution, thereby substantially reducing neutral oil formation by the addition of said salt.

(References on following page)

References Cited

UNITED STATES PATENTS

| | | | |
|---|---|---|---|
| 2,771,484 | 11/1956 | Blaser et al. | 260—459 |
| 3,150,161 | 9/1964 | Nunn | 260—457 |
| 2,163,651 | 6/1939 | Werntz | 260—459 |
| 2,928,860 | 3/1960 | Harrington | 260—458 |
| 3,484,474 | 12/1969 | Krause | 260—459 |

OTHER REFERENCES

E. E. Gilbert, Sulfonation, N.Y. (1965), pp. 19, 360 and 361.

HOWARD T. MARS, Primary Examiner

L. DeCRESCENTE, Assistant Examiner